United States Patent [19]

Thomas

[11] Patent Number: 4,580,024
[45] Date of Patent: Apr. 1, 1986

[54] MICROWAVE DEEP FAT FRYER

[76] Inventor: Perry W. Thomas, 12708 12th St., Grandview, Mo. 64030

[21] Appl. No.: 725,483

[22] Filed: Apr. 22, 1985

[51] Int. Cl.[4] ............................................. H05B 6/80
[52] U.S. Cl. ..................... 219/10.55 E; 219/10.55 B; 219/10.55 D; 219/417; 99/DIG. 14; 99/407; 99/410; 426/243
[58] Field of Search ................. 219/10.55 E, 10.55 B, 219/10.55 D, 10.55 C, 10.55 R, 10.55 A, 415–419; 99/403, 407, 410–415, 451, DIG. 14; 426/241, 243, 234

[56] References Cited

U.S. PATENT DOCUMENTS

| | | | |
|---|---|---|---|
| 1,174,559 | 3/1916 | Frost | 99/414 |
| 2,191,275 | 2/1940 | Fink | 99/410 X |
| 2,550,758 | 5/1951 | Bemis | 99/414 |
| 2,919,336 | 12/1959 | Hahn | 219/10.55 R |
| 2,997,566 | 8/1961 | Pierce et al. | 219/10.55 E |
| 3,501,316 | 3/1970 | Guthrie, Sr. | 99/407 X |
| 3,525,299 | 8/1970 | Gouwens et al. | 99/410 X |
| 4,246,462 | 1/1981 | Meisel | 219/10.55 A |
| 4,334,136 | 6/1982 | Mahan | 219/10.55 D X |
| 4,450,757 | 5/1984 | Alfio | 99/407 X |

*Primary Examiner*—Philip H. Leung
*Attorney, Agent, or Firm*—Kokjer, Kircher, Bradley, Wharton, Bowman & Johnson

[57] ABSTRACT

In a deep fat frying appliance, microwave energy is applied by separate magnetrons to a pair of ceramic vessels located side by side. The foods are held in baskets which are connected with lids for the vessels by slotted brackets which lower the baskets into the vessels when the lids are closed and lift the baskets out of the oil for drainage when the lids are opened. Each magnetron is maintained in a deenergized state unless the corresponding lid is fully closed to depress a plunger switch.

12 Claims, 3 Drawing Figures

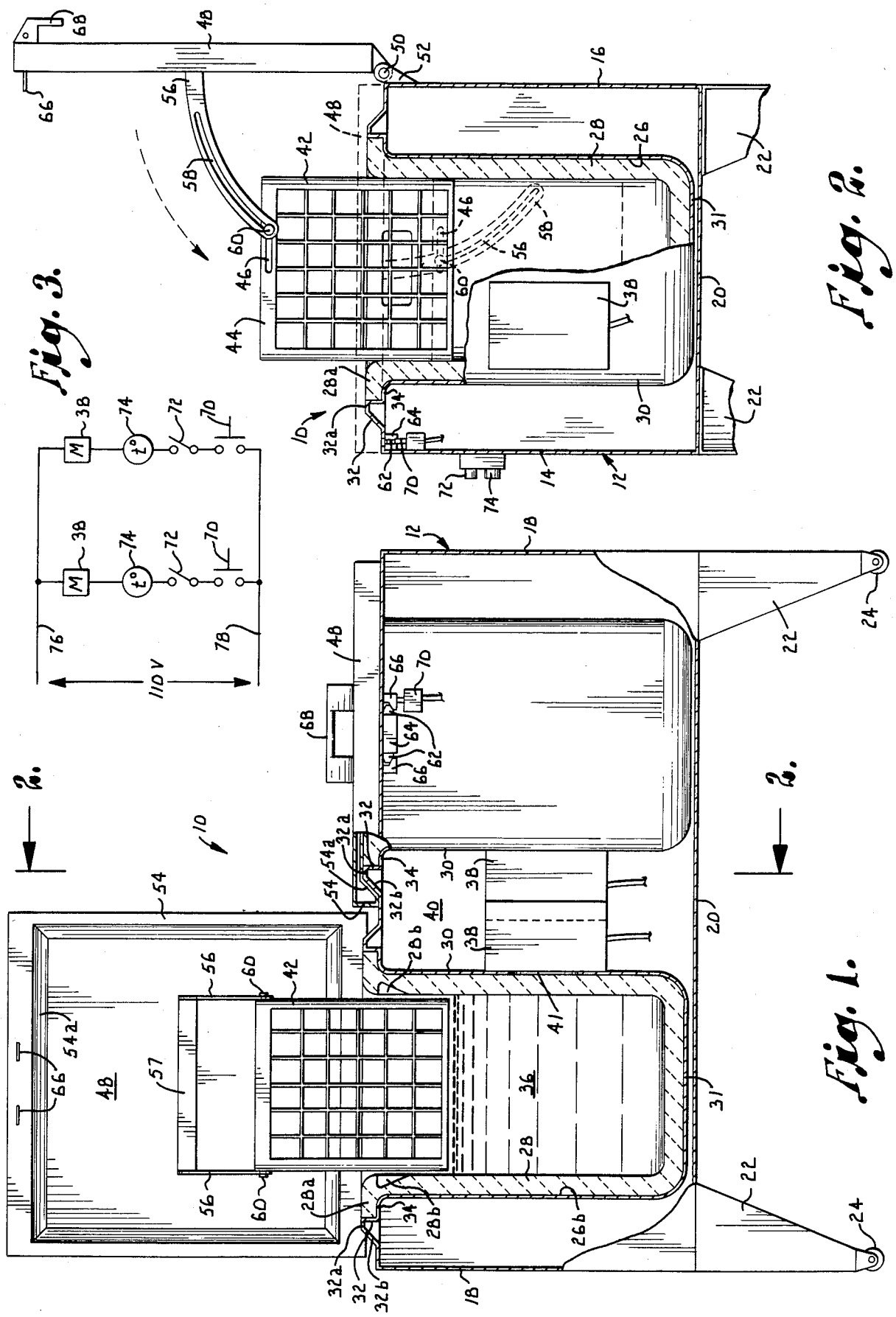

MICROWAVE DEEP FAT FRYER

BACKGROUND AND SUMMARY OF THE INVENTION

This invention relates in general to cooking appliances and more particularly to a deep fat fryer which uses microwave energy for heating of the oil or fat used in the deep frying of foods.

To my knowledge, the advantages of microwave energy have not been applied in the deep fat frying of foods. Typically, deep fat fryers include electrical heating elements which are energized to heat the fat or oil in which foods are cooked, and these appliances are thus plagued by the inefficiencies that are characteristic of electrical resistant heating. The present invention is directed to a deep fat fryer in which the operating efficiency is enhanced by using microwave energy for generating the necessary heat.

More specifically, it is an object of the invention to provide a deep frying appliance which is constructed to effectively and efficiently use microwave energy for heating of the oil in which foods are fried.

Another object of the invention is to provide an appliance of the character described in which the cooking vessel is sealed by a hinged lid.

Another object of the invention is to provide, in an appliance of the character described, an arrangement for automatically lifting the cooking basket to a grease draining position when the lid is opened. The linkage which connects the lid with the basket also causes the basket to be immersed in the cooking oil when the lid is closed.

A further object of the invention is to provide an appliance of the character described which can be used in a safe manner.

An additional object of the invention is to provide a deep frying appliance in which two cooking vessels are located side by side and are heated by separate magnetrons mounted between the vessels in a compact overlapping configuration which makes effective use of the available space.

A still further object of the invention is to provide an appliance of the character described which is constructed in a simple and economical manner and which operates on electrical power supplied at 110 volts.

Other and further objects of the invention, together with the features of novelty appurtenant thereto, will appear in the course of the following description.

DETAILED DESCRIPTION OF THE INVENTION

In the accompanying drawing which forms a part of the specification and is to be read in conjunction therewith and in which like reference numerals are used to indicate like parts in the various views:

FIG. 1 is a front elevational view of a deep fat frying appliance constructed according to a preferred embodiment of the present invention, with one lid open and the other closed and portions broken away to illustrate certain internal details;

FIG. 2 is a fragmentary sectional view taken generally along line 2—2 of FIG. 1 in the direction of the arrows; and FIG. 3 is a schematic diagram of the electrical circuit which controls the operation of the appliance.

Referring now to the drawing in more detail, numeral 10 generally designates an appliance which uses microwave energy in the deep fat frying of foods. The appliance 10 has a box-like housing 12 which may be formed from sheet metal or another suitable material. The housing 12 includes front and back walls 14 and 16, opposite side walls 18, and a bottom panel 20. The housing is supported on four legs 22 having caster wheels 24 which permit the appliance to be rolled along the floor.

Extending into the top of the housing 12 are a pair of side by side cavities 26 which form receptacles for receiving a pair of removable ceramic vessels 28. Each cavity 26 has a wall 30 and a closed bottom 31 preferably formed from sheet metal. Extending around the open top of each cavity 26 is an upstanding rib 32 having a flat top surface 32a and an inclined surface 32b which slopes from the top of the housing to connection with the top surface 32a of the rib. A shoulder 34 is presented on the top of the housing between rib 32 and the wall 30 of each cavity.

Each vessel 28 is formed from a high density ceramic material, and the vessels conform in shape to the cavities 26. A flange 28a is turned outwardly from the open top end of each vessel 28. When vessel 28 is inserted in cavity 26, the flange 28a rests on shoulder 34, and the outer edge of the flange butts against the rib 32. A pair of opposing cut outs 28b are formed in the inside surface of each vessel 28 at a location slightly below its top end. The cut outs 28b provide finger grips which facilitate lifting of the vessel out of its cavity 26.

Each ceramic vessel 28 holds a quantity of fat or oil 36 used in the deep fat frying of foods. Each vessel 28 is equipped with a magnetron 38 which may be conventional in its construction and manner of operation. The two magnetrons 38 are mounted to the cavity walls 30 within a magnetron space 40 formed in the housing 18 at a location between the walls 30. The magnetrons 38 are staggered or offset relative to one another so that they partially overlap, as best shown in FIG. 1. Due to this offset, staggered arrangement of the magnetrons, effective use is made of the room that is available within the space 40. An opening 41 is formed in each wall 30 adjacent the magnetron 38 so that the microwaves that are generated by the magnetrons are applied to the ceramic vessels 28. Each magnetron is equipped with a suitable wave guide and related components for directing the microwave energy in a manner to distribute the energy substantially uniformly throughout the volume of oil 36 contained within each vessel 28.

Each vessel 28 is provided with a basket 42 for containing the foods that are to be deep fried in the oil 36. Each basket 42 is an openwork structure which may be constructed from nylon or another substance capable of withstanding the temperatures to which the oil 36 is heated. Each basket 42 has a size to closely fit within the vessel 28 and a height to be substantially completely submerged in the oil 36. Each basket 42 has a rim 44 adjacent its top end, and each rim is provided with a pair of horizontal slots 46 which are diametrically opposed to one another.

A pair of lids 48 are hinged to the housing 12 in order to open and close the cooking vessels 28. A horizontal hinge pin 50 connects the back edge of each door 48 with brackets 58 secured to the back wall 16 of the housing. Each door 48 is thus mounted on the housing for hinged movement between the open position shown in solid lines in FIG. 2 and the closed position shown in broken lines in FIG. 2.

Each door 48 has a peripheral rim 54 which includes an inclined sealing surface 54a inclined at substantially the same angle as surface 32b on the rib 32. When the door is in the closed position, surface 54a mates with and seals against surface 32b, and the top surface 32a of rib 32 seals against the surface of door 48 at a location adjacent to the rim 54, as best shown in FIG. 1 for the right hand door. In this manner, a tight seal is formed completely around the top of each vessel 28, and the wedging action between the mating inclined surfaces 32b and 54a enhances the effectiveness of the seal.

As each door 48 is opened and closed, the corresponding basket 44 is raised and lowered by a linkage which includes a pair of slotted brackets 56. The brackets extend from a mounting plate 57 (FIG. 1) which is secured to the inside surface of door 48. The brackets 56 are curved members each presenting an arcuate slot 58. The hinge pin 50 is located at the center of curvature of each slot 58. The brackets 56 engage opposite sides of basket 44, and a horizontal pin 60 extends through each pair of slots 46 and 58 in order to connect the basket 44 with the lid 48.

When the lid is closed, basket 34 is immersed in the oil 36 and the parts are in the position shown in broken lines in FIG. 2. Initial raising of lid 48 causes the slot 58 to move relative to pin 60 until the bottom end of slot 58 engages the pin 60. Further raising of lid 48 about the hinge pin 50 causes bracket 56 to pull upwardly on pin 60, thereby raising the basket 44. When the lid 48 is in the vertical position shown in solid lines in FIG. 2, the basket 44 is lifted partially out of the vessel 28 to a drainage position in which the basket is raised above the level of the oil in the vessel. Oil can then drain from the basket and foods back into the vessel. When the lid is lowered toward the closed position, basket 44 is simultaneously lowered into vessel 28 and eventually reaches the cooking position in which the basket is completely immersed in the oil in the vessel. The horizontal slots 46 permit the pins 60 to move from side to side as required during opening and closing movement of the lid.

Each lid 48 is latched in the closed position by a pair of spring loaded latch bolts 62 which extend from opposite sides of a latch body 64 mounted within the housing 12. The rim 54 of each lid 48 is provided with a pair of hook-like latch members 66 which are engaged by the latch bolts 62 when the lid is closed, as shown on the right side of FIG. 1. The latch bolts 62 are urged outwardly to their extended positions and are retracted into the latch body by latch members 66 as the lid approaches its fully closed position. Once the lid has been fully closed, the bolts 62 are fully extended and engage members 66 to latch the lid in the closed position. A handle 68 located on top of each lid 48 may be operated to release the latch members 66 from the latch bolts 62, thereby unlatching the lid and permitting it to be opened.

A normally open plunger switch 70 maintains each magnetron 38 in a deenergized condition unless the corresponding lid 48 is fully closed. Each plunger 70 is spring loaded toward its extended position in which the switch is open. However, one of the latch members 66 acts against the plunger 70 in order to depress it when the door is in the closed position. When the plunger 70 is depressed, the switch is closed to permit the corresponding magnetron to be activated.

The controls for each magnetron include an on-off switch 72 and a temperature select knob 74. These controls are preferably located on the front panel 14 of the housing. As shown in FIG. 3, the two magnetrons 38 and their controls are arranged in parallel with one another across a pair of electrical lines 76 and 78. Each magnetron 38 is in series with the plunger switch 70, the on-off switch 72, and the temperature select knob 74. The power lines 76 and 78 lead to a conventional plug (not shown) which may be inserted into an ordinary 110 volt electrical outlet to apply 110 volts across lines 76 and 78.

In operation of the appliance 10, each vessel 28 is partially filled with oil 36 to the desired level. Each vessel can be used independently to deep fry foods which are inserted into the corresponding basket 42. With lid 42 in the open position, the food is inserted into basket 42, and the lid can then be closed. When the lid has been fully closed, the basket 42 and its contents are immersed in the oil, and the plunger switch 70 is closed by latch members 66. If for some reason the lid is not fully closed, switch 70 is not depressed and it remains in the open condition to interrupt the circuit for the corresponding magnetron 38, thereby preventing energization of the magnetron.

After the lid has been properly closed, the on-off switch 72 is turned to the on position, and the temperature selector 74 is set at the desired temperature at which cooking is to be carried out. The magnetron 38 is then energized to produce microwaves which are applied through opening 41 to the ceramic vessel 28 and its contents. The microwave energy heats the oil 36 and frys the foods which are carried in the basket 42. When the temperature of the oil exceeds the temperature set on the selector knob 74, the selector interrupts the circuit and deenergizes the magnetron. Likewise, the magnetron cannot be energized unless the on-off switch is in the "on" or closed position.

After the cooking has been completed, handle 68 is raised to release latch members 66 from the latch bolts 62 to permit the lid to be raised. As soon as the lid has been raised from its fully closed position, member 66 is released from plunger switch 70 which then returns to its normally open position to deenergize the magnetron. When the lid has been raised to the position shown in FIG. 2, the basket 42 is in the drainage position, and oil is preferably allowed to drain from the basket and its contents before the foods are removed from the basket.

The two vessels 28 can be used to cook the same or different foods simultaneously, or only one of the vessels can be used at a time. The two vessels and their controls are independent of one another, and each vessel is equipped with its own magnetron 38 which can be energized only when the corresponding lid is fully closed. The vessels 28 can be easily removed from their cavities 26 for cleaning and other purposes.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. Apparatus for deep frying foods in oil, said apparatus comprising:

an open topped vessel for holding the oil, said vessel having a side wall and a bottom;

a housing presenting an open topped cavity for receiving said vessel therein, said cavity having a side wall and a bottom and having a size and shape to closely receive the vessel therein with the side wall of the vessel adjacent and inwardly of the side wall of the cavity and the bottom of the vessel adjacent and above the bottom of the cavity, said vessel being removable from said cavity for cleaning of the vessel;

a basket for receiving and holding the foods, said basket fitting in the vessel to submerge the foods in the oil contained in the vessel and said basket being removable from the vessel to remove the foods therefrom;

a magnetron in said housing located adjacent said side wall of the vessel for applying microwave energy through the side wall of said cavity to said vessel to heat the oil therein when the magnetron is energized, whereby to fry the foods in the basket in response to heatng of the oil by said magnetron;

a lid on said housing supported for hinged movement thereon about a substantially horizontal hinge axis between an open position and a closed position to respectively open and close the top of the vessel; and means for maintaining said magnetron in a deenergized condition unless said lid is in the closed position.

2. Apparatus as set forth in claim 1, including:

a shoulder on said housing at a location adjacent said cavity; and a flange on the top of the vessel projecting outwardly therefrom and resting on said shoulder when the vessel is placed in the cavity.

3. Apparatus as set forth in claim 1, including:

an upstanding rib on said housing extending around said cavity, said rib presenting a sealing surface thereon for sealing against the lid; and a peripheral rim on said lid having a sealing surface thereon located to seal against said sealing surface of the rib in the closed position of the lid.

4. Apparatus as set forth in claim 3, wherein said sealing surfaces are inclined to mate against one another in the closed position of the lid.

5. Apparatus as set forth in claim 4, including a top surface of said rib and a lid surface on said lid located to seal against said top surface in the closed position of the lid.

6. Apparatus as set forth in claim 1, including:

means for lifting said basket partially out of the vessel to a drainage position in response to raising of said lid about said hinge axis to the open position, said basket being located above the level of the oil in said vessel in the drainage position to permit oil to drain from the basket into the vessel; and means for lowering said basket into said vessel to a cooking position in response to lowering of said lid about said hinge axis to the closed position, said basket being immersed in the oil in the vessel in the vessel in the cooking position to permit the foods in the basket to be fried in the oil.

7. A deep fat frying appliance comprising:

an open topped vessel for holding oil in which foods are to be fried;

a housing having means for receiving and holding said vessel;

a basket for receiving and holding the foods, said basket having a size to fit in said vessel to immerse the foods in the oil contained therein;

a lid for covering the top of said vessel;

hinge means for mounting said lid on the housing in a manner permitting the lid to be raised and lowered about a substantially horizontal hinge axis between a closed position wherein the lid seals the top of the vessel and an open position wherein the top of the vessel is exposed for insertion and removal of the basket;

a bracket carried on said lid at a location offset from said hinge axis, said bracket having an arcuate slot therein having a center of curvature located at said hinge axis;

a rim on the top of said basket, said rim presenting a generally horizontal slot therein;

a pin extending through said arcuate and horizontal slots and slidable in each slot to connect said bracket and basket, said pin moving to one end of said arcuate slot upon initial raising of the lid from the closed position, whereby further raising of the lid causes said pin to pull upwardly on said rim to lift the basket to a drainage position when the lid is raised to the open position, said basket being lowered by the lid to a cooking position when the lid is lowered to the closed position, said basket being immersed in the oil in the vessel in the cooking position and being raised above the level of the oil in the drainage position to permit oil to drain from the basket into the vessel; and magnetron means for applying microwave energy to said vessel to heat the oil therein for deep fat frying of the foods immersed therein.

8. Deep fat frying apparatus comprising:

a housing presenting a pair of spaced apart cavities therein arranged side by side;

a pair of open topped vessels fitting removably in the cavities, each vessel being adapted to contain oil in which foods are to be fried;

a basket for each vessel, said baskets being adapted to receive and hold foods and fitting removably in the vessels to immerse the foods in the oil contained therein;

a lid for each vessel, each lid being mounted on said housing for movement about a substantially horizontal hinge axis between an open position wherein the top of the corresponding vessel is exposed and a closed position wherein the lid covers the top of the corresponding vessel;

a magnetron space presented in the housing between said cavities; and a magnetron for each cavity mounted in said space adjacent the corresponding cavity, said magnetrons being staggered and arranged to overlap one another and each magnetron being operable when activated to apply microwave energy to the corresponding vessel for heating of the oil therein to effect deep fat frying of the food immersed in the oil, said magnetrons being activated and deactivated independently of one another to permit selective frying of food in one or both vessels simultaneously.

9. Apparatus as set forth in claim 8, wherein:

each cavity includes a side wall;

said magnetron space is defined between said side walls; and said magnetrons are mounted on said side walls of the respective cavities.

10. Apparatus as set forth in claim 8, including:

means for lifting each basket partially out of the corresponding vessel to a drainage position in response to raising of the corresponding lid to the open position, each basket being raised above the level of the oil in the corresponding vessel in the drainage position to permit oil to drain from the basket into the vessel; and means for lowering each basket into the corresponding vessel to a cooking position in response to lowering of the corresponding lid to the closed position, each basket being immersed in the oil in the corresponding vessel in the cooking position.

11. Apparatus as set forth in claim 8, including means for maintaining each magnetron in a deenergized condition unless the corresponding lid is in its closed position.

12. Apparatus as set forth in claim 8, including releaseable means for latching each lid in its closed position.

* * * * *